No. 891,773. PATENTED JUNE 23, 1908.
F. HEITZLER.
TELESCOPE FOR SURVEYING INSTRUMENTS.
APPLICATION FILED APR. 1, 1907.
2 SHEETS—SHEET 2.
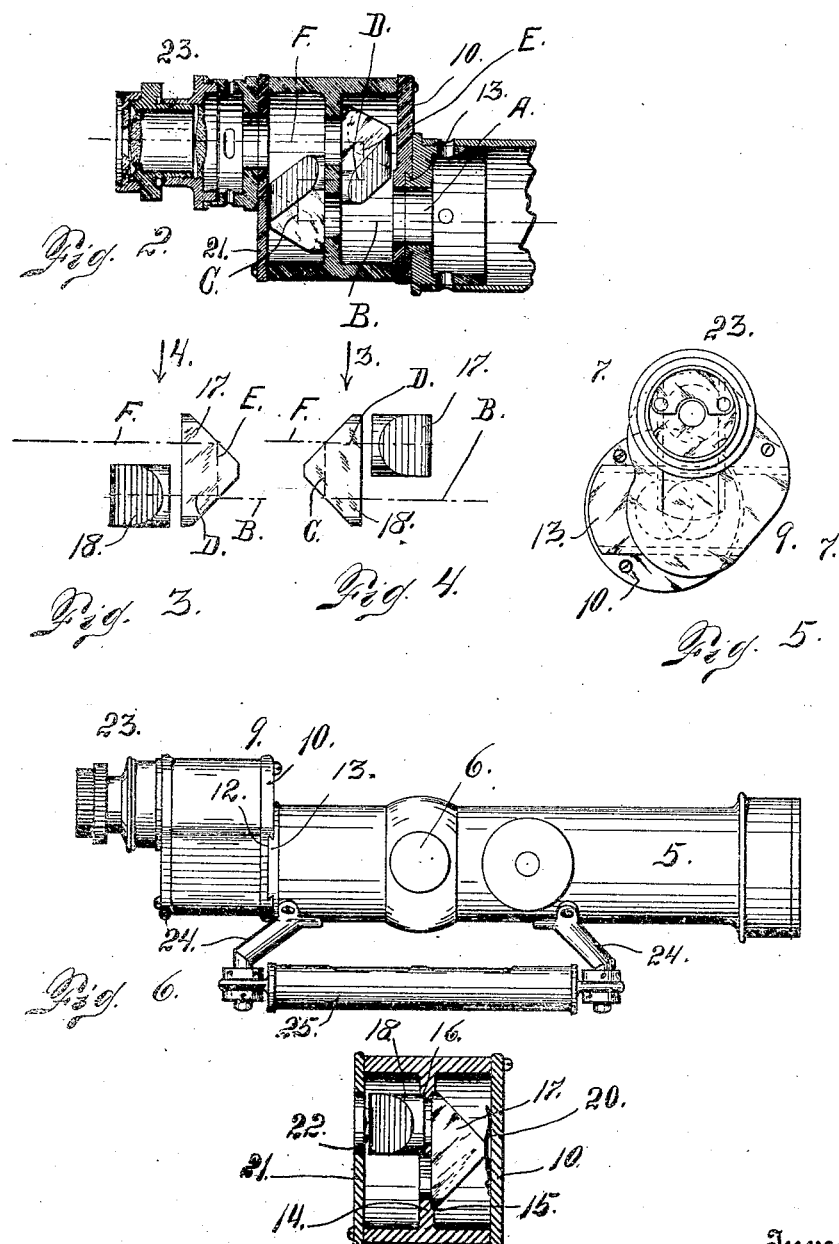

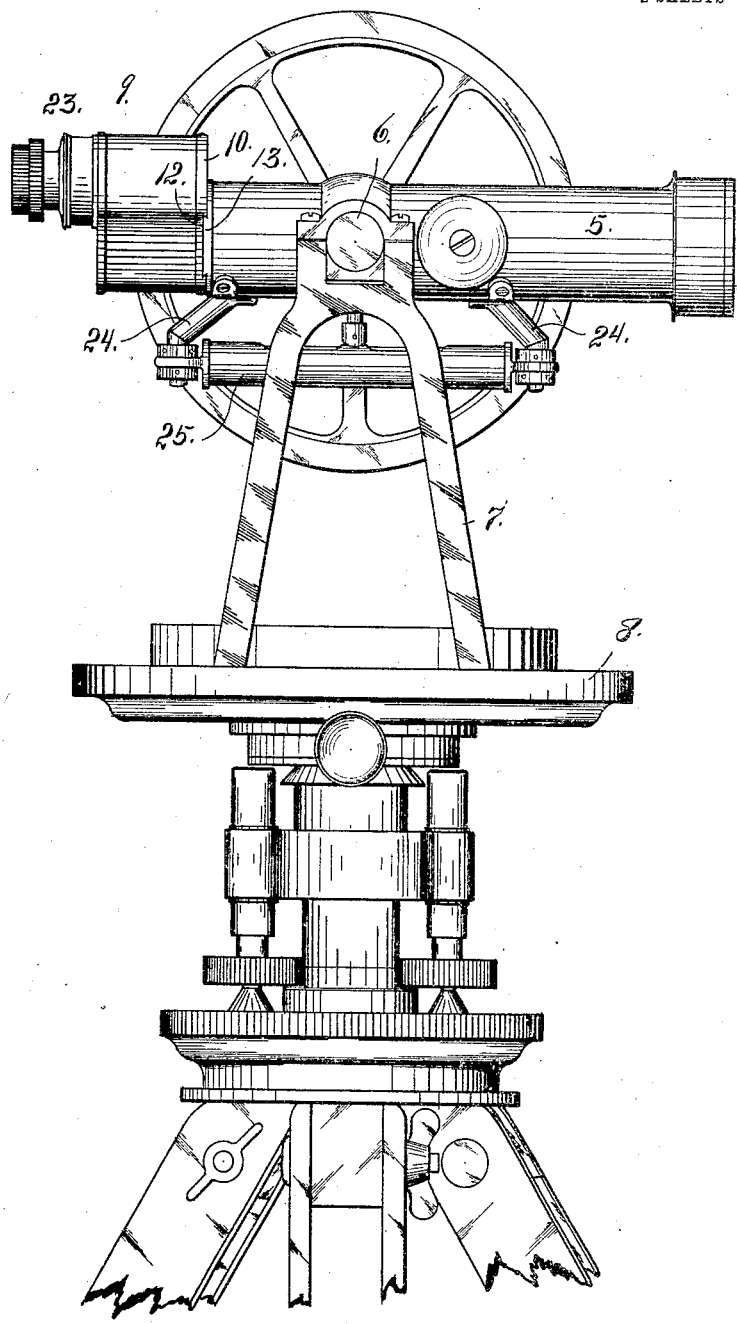

UNITED STATES PATENT OFFICE.

FRANK HEITZLER, OF DENVER, COLORADO.

TELESCOPE FOR SURVEYING INSTRUMENTS.

No. 891,773.　　　Specification of Letters Patent.　　Patented June 23, 1908.

Application filed April 1, 1907. Serial No. 365,640.

*To all whom it may concern:*

Be it known that I, FRANK HEITZLER, a citizen of the United States, residing in the city and county of Denver and State of Colorado, have invented certain new and useful Improvements in Telescopes for Surveying Instruments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in telescopes for surveying instruments, my object being to provide an instrument of this class whose tube shall be of less length than the ordinary telescope without interfering with the proper focus of magnification. In other words it is necessary that the rays of light shall travel from the lens of the telescope, a predetermined distance in order to properly magnify the object in view. By means of my improvement, I employ a plurality of prisms set into a case between the eye piece and the body of the tube, whereby the rays of light are reflected and caused to travel in an irregular path, thus increasing the length of travel and making it practicable to employ a tube of less length than under ordinary conditions. By using a tube of less length, the supporting standard of the instrument may also be made shorter, all of which is extremely advantageous in instruments of this class.

Having briefly outlined my invention, I will proceed to describe the same in detail reference being made to the accompanying drawing in which is illustrated an embodiment thereof.

In this drawing, Figure 1 is a side elevation of a surveying instrument equipped with my improved telescope. Fig. 2 is a section taken through the eye-piece extremity of the instrument, cutting the prism case on the forward extremity of the tube. Fig. 3 is a view illustrating the relative arrangement of the two prisms within the prism case, the dotted line showing the path of a ray of light refracted by the prisms. Fig. 4 is a view looking in the direction of arrow 4 in Fig. 3. Fig. 3 may also be said to be a view looking in the direction of arrow 3 in Fig. 4. Fig. 5 is an end elevation of the eye-piece extremity of a telescope provided with my improvement. In this view the lateral adjustment of the eye-piece is illustrated. Fig. 6 is a side elevation of the telescope which is shown in detail. Fig. 7 is a section taken through the prism case showing the relative arrangement of the two prisms.

The same reference characters indicate the same parts in all the views.

Let the numeral 5 designate the tube of the telescope which is trunnioned at 6 on support 7 resting upon the base 8. To the rear extremity of the tube is slidably mounted a prism case 9. To the forward extremity of this case is secured a plate 10 having a dove-tailed groove 12 adapted to receive a tongue 13 formed on the rear extremity of the tube. By virtue of this construction the prism case may be laterally adjustable in order to bring its prisms into proper relation with the tube whereby the rays of light passing from the object may be properly reflected. Within the body of this prism case which is an integral structure, is located a diaphragm 14 provided with recesses 15 and 16 formed in its opposite surfaces and in which are fit two prisms 17 and 18 occupying positions at right angles to each other. A base of each prism engages the rest of the diaphragm while its apex of one prism is engaged by the forward plate 10 which is provided with a leaf spring 20 forming a cushion bearing on the apex of the prism; while the prism 18 is similarly held in place by a rear plate 21 of the prism casing, the same being provided with a spring 22 forming a yielding bearing for the prism.

The end plate 21 of the prism and the eye-piece 23, are slidably connected by a suitable tongue and groove construction which is indicated by dotted lines in Fig. 5. The connection is such that the eye-piece may be laterally adjusted, at right angles to the adjustment of the prism case. The object of these adjustments is to bring the eye-piece and the prisms into proper operative relation with the tube of the instrument. In my improved instrument the prisms are securely held in place against displacement or adjustment which is exceedingly important in instruments of this class. I therefore rely upon the adjustments which I am able to obtain by virtue of the special connection of the prism case with the tube and the eye-piece with the prism case, whereby both of these devices may be laterally adjusted at will, thus making it practicable to bring all the parts of the instrument into proper harmony and coöperation under all circumstances without disturbing the relative relation of the two prisms.

From the foregoing description the use and operation of my improved instrument will be readily understood. Referring more especially to Fig. 2, a ray of light passing from the object in view, through the lens of the forward extremity of the instrument, will pass through the opening A in the plate 10 of the prism case, and following the direction of the dotted line B, will strike the base of the prism; this ray will then be refracted in the path C at right angles to the line A until it reaches another face of the prism when it will be again refracted in the direction indicated by the dotted line D, at right angles to the line C and parallel with the line B until it enters the base of the other prism when it will be again subjected to refraction in the line E at right angles to the line D, and again in the line F at right angles to the line E and parallel with the lines B and D, and thence through the eye-piece to the eye of the observer. By virtue of this explanation it will be understood that the arrangement of the prisms causes the reflection of the ray of light whereby it is made to travel a sufficient distance to allow the making of the telescope tube much shorter than the ordinary tube, without interfering with the proper focus of magnification.

In shortening the telescope I find it necessary to support the spirit level tube by means of outwardly inclined or offset arms 24. The upper extremities of these arms is secured to the telescope as far apart as possible. However, by inclining them in both directions toward the extremities of the telescope, a spirit level tube 25 of suitable length for accurate work is obtained. Without this special construction of support, the telescope tube would be too short for practical purposes.

Having thus described my invention, what I claim is:

1. A telescope for surveying instruments provided with a tube, a case containing a plurality of prisms, the said case being laterally adjustable upon the tube for the purpose set forth.

2. A telescope provided with a tube, an eyepiece, a case containing a plurality of prisms arranged to reflect the light between the tube and the eye-piece, the said case being laterally adjustable on the tube, substantially as described.

3. A telescope for surveying instruments provided with a tube, an eyepiece, a case containing a plurality of prisms adapted to reflect the light in its passage from the tube to the eye-piece, said case being slidably adjustable in a lateral direction upon the tube, the eye-piece being laterally adjustable upon the prism case, substantially as described.

4. A telescope provided with a tube, a case containing a plurality of prisms, the said case being laterally adjustable upon the tube, and an eye-piece being laterally adjustable on the case at right angles to the adjustment of the case on the tube, substantially as described.

5. A telescope for surveying instruments, provided with a spirit level tube and supporting arms therefor, the said arms being connected with the telescope and being outwardly inclined or offset in both directions toward the extremities of the telescope, whereby a spirit level tube of suitable length may be employed.

6. A telescope provided with a tube, an eye piece, a casing whose body portion is formed integral or in one piece and contains a plurality of prisms arranged to reflect the light between the tube and e e piece, said casing being laterally adjustable on the tube, substantially as described.

In testimony whereof I affix my signature in presence of two witnesses.

FRANK HEITZLER.

Witnesses:
DENA NELSON,
MAY GAWLEY.